(No Model.)
P. B. H. SMITH.
CIRCULAR SAWING MACHINE.
No. 322,134. Patented July 14, 1885.
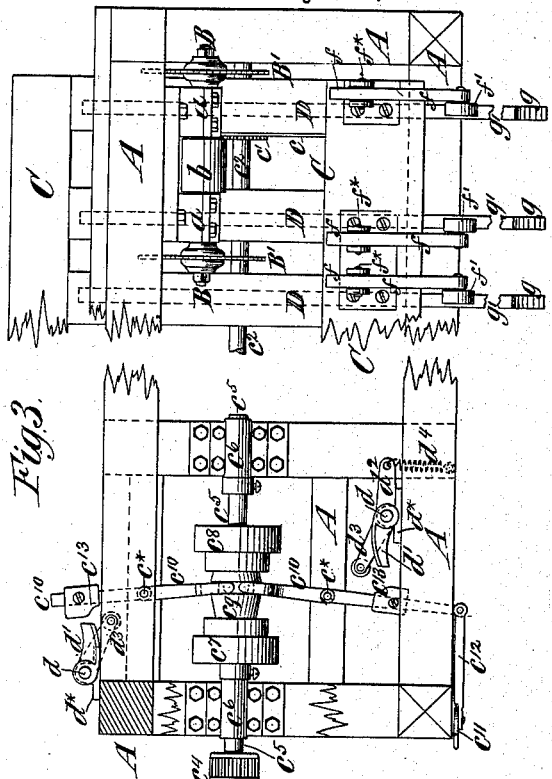
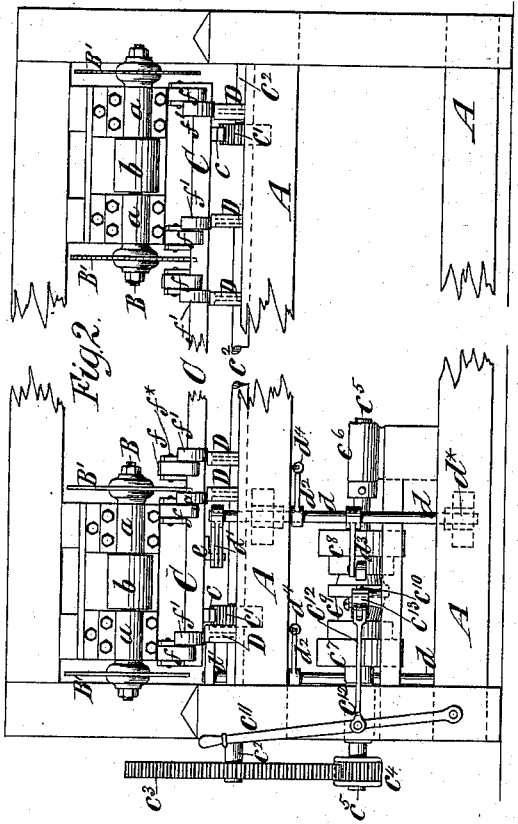
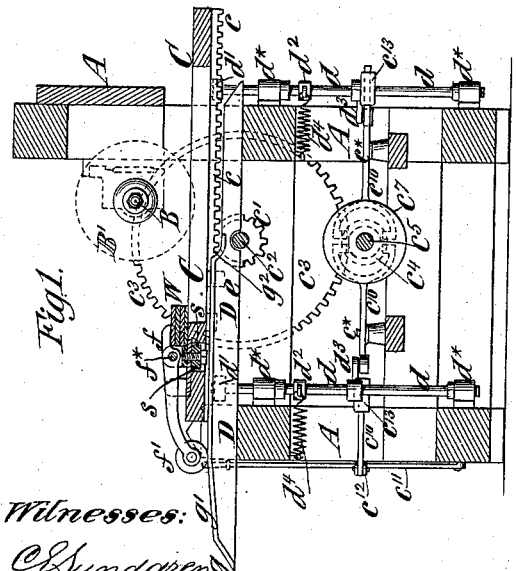
Witnesses:
C. F. Lundgren
Emil Harter.
Inventor:
Perez B. H. Smith
by his Attys.
Brown & Hae

UNITED STATES PATENT OFFICE.

PEREZ B. H. SMITH, OF BROOKLYN, NEW YORK.

CIRCULAR SAWING MACHINE.

SPECIFICATION forming part of Letters Patent No. 322,134, dated July 14, 1885.

Application filed May 16, 1885. (No model.)

*To all whom it may concern:*

Be it known that I, PEREZ B. H. SMITH, of Brooklyn, in the county of Kings and State of New York, have invented a new and useful Improvement in Circular Sawing Machines, of which the following is a specification.

My invention relates to cutting-off sawing-machines wherein are employed two or more saw-mandrels having saws arranged upon them in pairs, the saws being arranged at predetermined distances apart, and a sliding saw-table on which the boards are placed in position parallel with the saw-mandrels, and by the movement of which under the saws the boards are cut up into pieces of desired lengths to form parts of boxes or for other purposes.

In the Letters Patent No. 306,186, granted October 7, 1884, to E. C. Smith, are shown lever-clamps which are carried by the sliding saw-table, and which are operated manually by a hand-lever and cam to clamp boards preparatory to the forward movement of the saw-table under the saws. In said Letters Patent the gearing for imparting movement to the saw-table is operated from a counter-shaft having two pulleys, which are to be driven in opposite directions by open and crossed belts and an interposed sliding clutch which is operated by a hand-lever to reverse the direction of movement of the saw-table and produce its reciprocation, and which, therefore, requires constant attention from the workman.

One object of my invention is to render the operation of the lever-clamps above described automatic, so that as the saw-table is moved back and forth the lever-clamps will be automatically operated to clamp and release the boards without any attention from the workman. Another object is to provide means whereby the aforesaid clutch will be operated automatically to reverse the movement of the table as the table approaches each end of its movement, and thereby to relieve the workman of the necessity of operating a hand-lever periodically to reverse the direction of movement of the saw-table. These desirable objects are accomplished by combinations of parts hereinafter described, and pointed out in the claims.

In the accompanying drawings, Figure 1 is a vertical section of a machine embodying my invention in a plane transverse to the length of the saw-arbors. Fig. 2 is a front elevation of the machine, a portion of the machine intermediate between its ends being broken away to reduce the length of the figure; and Fig. 3 is a plan of the parts of the machine shown in Fig. 2, the left-hand portion being represented with the saw-arbor, saw-table, and other parts removed in order to show clearly the reversing mechanism.

Similar letters of reference designate corresponding parts in all the figures.

A designates the frame of the machine, which may be of wood or metal; and B B designates saw-arbors supported in boxes $a\ a$, and on which are secured saws B′ and pulleys $b$, which are to receive belts for driving the arbors and saws.

The machine may be of a length to carry any desired number of saw-arbors and saws, and the saws throughout the series are to be set at such distances apart as to saw or cut off boards into pieces of desired length.

C designates a table, which slides back and forth along tracks or ways on the bed or frame, and has attached to it near opposite ends racks $c$, with which engage pinions $c'$ on a shaft, $c^2$, extending parallel with the saw-arbors B. The shaft $c^2$ receives motion by a wheel and pinion, $c^3\ c^4$, from a counter-shaft, $c^5$, supported in boxes $c^6$, below the saw-table. On the counter-shaft $c^5$ are pulleys $c^7\ c^8$, which are to be driven continuously in opposite directions by open and cross belts. (Not here shown.) Between the pulleys $c^7\ c^8$ is a sliding clutch-piece, $c^9$, with which are connected clutch-levers $c^{10}$, fulcrumed at $c^*$. With one of these levers $c^{10}$ a hand-lever, $c^{11}$, is connected by a rod, $c^{12}$, and by these means the clutch $c^9$ may be shifted by hand when desired.

I will now describe how the clutch $c^9$ may be shifted automatically during the operation of the machine. At the front and back of the machine are upright rock-shafts $d$, supported in bearings $d^*$, and each having upon it three arms, $d'\ d^2\ d^3$. To the arm $d^2$ of each shaft is attached a spring, $d^4$, for turning the shaft to the position shown in Fig. 3, after it has been turned a short distance in the opposite direction, as I shall soon describe. The arm $d'$ is upon the top of the shaft $d$, and on the under side of the table C is a projection or tappet, $e$, which comes in contact with the arms $d'$ of the two shafts $d$ alternately as the table nears the end of each movement. On each clutch-lever $c^{10}$ is a cam-like projection, $c^{13}$, formed on an adjustable collar or slide, as shown in Fig. 3, and as one or other of the shafts $d$ is turned by the projection $e$ on the table striking the arm $d'$, the arm $d^3$ of that shaft will act on the projection $c^{13}$ of one of the levers $c^{10}$, and by moving said lever will shift the clutch $c^9$, and reverse the direction of movement of the saw-table. For example, supposing that the shaft $c^5$ is receiving motion from the pulley $c^8$, and that the table is moving forward under the saws. When the tappet or projection $e$ on the table strikes the arm $d'$ on the shaft $d$, which is at the top of Fig. 3, it will turn said shaft, and, by bringing its arm $d^3$ against the projection $c^{13}$ on the lever $c^{10}$, will shift said lever, and thereby move the clutch $c^9$ into engagement with the pulley $c^7$, to reverse the direction of rotation of the shaft $c^5$ and the direction of movement of the saw-table.

I will now describe how the work is clamped and held to the saw-table automatically. On the front of the table C are a number of lever-clamps, $f$, fulcrumed at $f^*$, and carrying at their front ends rollers $f'$. These lever-clamps are adapted to clamp and hold upon the top of the table a number of boards piled on one another, as shown at W in Fig. 1.

Projecting forward from the frame A and ranging vertically with the rollers $f'$ on the lever-clamps $f$, and extending below the table and parallel with the direction of movement thereof, are a number of tracks or ways D, the shape or top profile of which is shown most clearly in Fig. 1. At the front end of each track or way is an abrupt incline, $g$, followed by a gradual incline, $g'$, and then the track or way is level until its inner end is reached, where there is a depression or drop, $g^2$. When the table moves forward to its fullest limit, the rollers $f'$ are carried beyond the inclines $g$, and the roller ends of the lever-clamps fall by their weight and raise the clamping-jaws at the opposite ends of the levers. The table then moves forward, and as the rollers $f'$ pass the inclines $g$ $g'$ of the tracks or ways they actuate the lever-clamps $f$ to tightly grip and clamp the work W before it reaches the saws. At the end of the inward movement of the saw-table C the rollers $f'$ reach the depressions or drops $g^2$ in the tracks or ways D, and the work W is thereby released from the clamps. When the boards are thus released by the lever-clamps, they may be removed by hand, or I may employ pivoted drops attached to the frame A, arranged to be lifted by the boards as they pass under them on the moving table to the saws, to fall behind the boards when they have passed, and to operate in connection with the moving table for removing cut boards therefrom. I have not shown such pivoted drops, as they form no part of my invention, but are described and claimed in the patent to E. C. Smith, hereinabove referred to. As here shown, the lever-clamps $f$ are pivoted at $f^*$ in forks formed on the heads of bolts secured in the saw-table C, and springs $s$ of india-rubber or other material may be applied to these bolts, as shown in Fig. 1, to compensate for slight differences in the height of the pile of boards W.

What I claim as my invention, and desire to secure by Letters Patent, is—

1. The combination, with saw-arbors and saws, and a reciprocating saw-table, of lever-clamps pivoted to said table and serving to clamp the work upon the top of the table, and tracks or ways arranged below the table and extending parallel with the direction of movement of the table, the said tracks or ways having cam-like or inclined upper surfaces whereby the lever-clamps are automatically operated to clamp the work as the saw-table is reciprocated, substantially as herein described.

2. The combination, with saw-arbors and saws and a reciprocating saw-table provided with a projecting lug or tappet, of gearing for operating the table, a clutch whereby the direction of movement of the table may be reversed, levers for shifting said clutch, and rock-shafts arranged at the front and back of the machine, and having arms which are acted upon alternately by the projection or tappet on the table, and other arms which act upon the clutch-levers for shifting them, substantially as herein described.

PEREZ B. H. SMITH.

Witnesses:
FREDK. HAYNES,
HENRY McBRIDE.